United States Patent [19]
deCarmo

[11] Patent Number: 5,838,996
[45] Date of Patent: Nov. 17, 1998

[54] SYSTEM FOR DETERMINING PRESENCE OF HARDWARE DECOMPRESSION, SELECTIVELY ENABLING HARDWARE-BASED AND SOFTWARE-BASED DECOMPRESSION, AND CONDITIONING THE HARDWARE WHEN HARDWARE DECOMPRESSION IS AVAILABLE

[75] Inventor: Linden A. deCarmo, Plantation, Fla.

[73] Assignee: International Business Machines Corporation, Austin, Tex.

[21] Appl. No.: 251,498

[22] Filed: May 31, 1994

[51] Int. Cl.[6] .............................. G06F 5/00; G06F 13/14; G06F 13/36
[52] U.S. Cl. ........................... 395/888; 395/885; 395/861
[58] Field of Search ................................. 395/821, 861, 395/888, 885

[56] References Cited

U.S. PATENT DOCUMENTS

| | | | |
|---|---|---|---|
| 4,386,416 | 5/1983 | Giltner et al. | 364/900 |
| 4,641,238 | 2/1987 | Kneib | 364/200 |
| 4,981,371 | 1/1991 | Gurak et al. | 380/49 |
| 5,054,360 | 10/1991 | Lisle et al. | 84/645 |
| 5,164,839 | 11/1992 | Lang | 358/335 |
| 5,191,431 | 3/1993 | Hasegawa et al. | 358/323 |
| 5,274,738 | 12/1993 | Daly et al. | 395/2 |
| 5,535,311 | 7/1996 | Zimmerman | 395/114 |
| 5,557,749 | 9/1996 | Norris | 395/200.18 |

OTHER PUBLICATIONS

"Connectivity", Kennedy, Windows Sources, vol. 2, n1, p. 329(2), Jan. 1994.

*Primary Examiner*—Thomas C. Lee
*Assistant Examiner*—Rehana Perveen
*Attorney, Agent, or Firm*—Jeffrey S. LaBaw; David H. Judson

[57] ABSTRACT

A digital signal manager that dynamically chooses between hardware and software compression/decompression (CODEC) so as to maximize the usage of any digital signal device hardware capabilities; and that provides a common, uncompressed data interchange format for applications regardless of any compression technique that may have been used to create the data file.

23 Claims, 6 Drawing Sheets

SYSTEM FOR DETERMINING PRESENCE OF HARDWARE DECOMPRESSION, SELECTIVELY ENABLING HARDWARE-BASED AND SOFTWARE-BASED DECOMPRESSION, AND CONDITIONING THE HARDWARE WHEN HARDWARE DECOMPRESSION IS AVAILABLE

FIELD OF THE INVENTION

This invention relates generally to systems that store and process digitized audio, video, and other signals using one or more compression techniques. More specifically, it relates to systems that translate between a common, uncompressed data format and any of several compressed data formats. These systems dynamically choose to perform the translation in software or in hardware. These systems base the choice on the particular data compression format used, and on the presence or absence of hardware translation resources.

BACKGROUND OF THE INVENTION

Digital signal devices ("devices") are computer peripheral devices that interface between computers and components that process analog signals, for example microphones, speakers, video cameras, or tape recorders. These devices may process a variety of data types including video, graphical, and audio signals. For example, "audio devices" are devices that process audio data. A commonly known type of audio device is a "sound board" connectable to a bus in a computer system. There are a number of commercially available sound boards.

A digital signal device periodically samples an analog input signal and encodes the sampled signal amplitude to generate a stream of digital words, which form "digital signals" or "digitized data". The name associated with the data may reflect its content, for example "audio data". The data can be stored in computer files, for example as a digital representation of music or animation. Digital signals can also be incorporated into files that contain other kinds of data, for example audio data may be incorporated into electronic mail, word processing, or spreadsheet files.

Digital signal applications ("applications") are programs that allow a user to manipulate stored digital signals, for example, to compose music or to cut a segment of audio data from one file and paste it into another file. A number of such digital signal applications are commercially available. Applications and digital signal devices interact with files of stored digital data by means of a file input/output (I/O) handler. The file I/O handler can be part of the computer operating system, and manages the administrative operations of opening and closing files and actually storing and retrieving data in a storage device.

An application can interact with a digital signal device by instructing the device to convert an analog input signal into a digital signal and to store the digital signal in a file ("recording"), or by instructing the device to retrieve a digital signal from a file and to convert the digital signal into an analog output signal ("playback"). Recording and playback are commonly referred to as "real-time" operations because the conversions required should take no longer than the actual time duration of the analog signal. During recording, playback, and other real-time operations, the application does not process the digital data, instead the digital signal device interacts directly with the file.

The increased use of digital audio, video, and other signal processing applications and devices has increased the amount of digital signal data that must be stored and processed by computers. Although the sampling rate and the number of bits per sample determine the actual amount of space required to store a given digital signal, in general, the space required is relatively large. Digital signals may include each bit of each sample, commonly referred to as "pulse code modulated (PCM)" or "uncompressed" signals. Alternately, the signals may be compressed to reduce the required storage space, commonly referred to as "compressed" signals.

Various techniques are used to perform the compression. These compression techniques are not compatible with one another, in that a file produced using one compression technique cannot be expanded or decompressed using another technique. Some of the more common techniques include Adaptive Pulse Code Modulation (APCM), $\mu$-law, and Run-Length Encoding (RLE). Generally, a file does not contain a mixture of compressed and uncompressed data, nor data produced by a mixture of compression techniques.

Some digital signal devices incorporate a hardware component known as a digital signal processor (DSP) and its associated memory and control circuitry. Hereinafter, a DSP and its associated components are referred to collectively as a "DSP". These devices can use the DSP to compress and decompress (COompress/DECompress or "CODEC") digital signals; this is commonly referred to as a "hardware CODEC" technique. DSP-equipped devices can also process uncompressed digital signals, but this wastes resources, since DSP-equipped devices are more expensive than devices without DSPs.

Devices without a DSP cannot process most compressed digital signals, and thus generally only operate with uncompressed digital signals. If such a device must operate with a compressed file, the CODEC function must be performed by software running on a central processing unit (CPU) in the associated computer before the device stores or retrieves the data from the file; this intermediate CODEC function is commonly referred to as a "software CODEC" technique.

Mismatches sometimes occur between a file's data type, uncompressed or compressed, and a device's ability to perform a hardware CODEC function. When these mismatches occur, they lead to one of two major problems: degraded system performance or poor resource utilization. Specifically, a compressed file being processed by a device that lacks hardware CODEC capabilities requires the CPU to perform extra processing, i.e. software compression/decompression, and so negatively impacts overall system performance. On the other hand, an uncompressed file being processed by a device that possesses hardware CODEC capabilities underutilizes the relatively expensive DSP and wastes storage space and I/O bandwidth, since a compressed file would take much less space.

Until now, creators of commercial digital signal files generally were compelled to supply uncompressed files in order to ensure maximum compatibility with the range of available devices. This consumed large amounts of file storage space; it also underutilized the DSP on systems with devices capable of performing a hardware CODEC function.

In a manner similar to digital signal devices, applications that manipulate digital signals must be able store and retrieve digital signals from files where the data may have been compressed using one of many compression techniques. In prior art systems, in order to store or retrieve data from a compressed file, an application must contain a software CODEC routine that matches the file's compression type.

Further, data is commonly structured when it is stored in a file. Specifically, the structure accords with a "file format", i.e. a specification of the layout of data words in the file's data portion and the content and layout of a file header. File formats are independent of the file contents, moreover applications may create several files, all containing the same type of data, but using different file formats. Files are often formatted differently under different operating systems, for example MS-DOS and OS/2®. Thus, each software CODEC routine must be written to compress and decompress data using both a particular compression technique and a particular file format. Since there are numerous compression types and file formats, each application must contain many such software CODEC routines in order to be compatible with as many compression types and file formats as possible.

However, applications that contain many CODEC routines have program size and complexity problems. Large or complex programs are more difficult to write, debug, and maintain. Each application writer must duplicate CODEC routines that already exist in other applications, introducing the problem of duplicated effort. New compression techniques are constantly being developed, so updating existing applications is also problematic. On the other hand, an application with only one or a small number of CODEC routines has a disadvantage in that it can process only a limited number of compression types and file formats.

Some prior art systems, therefore, support multiple compression types. These systems fall into two groups: "hardware-only" CODEC systems and "software-only" CODEC systems. Hardware-only CODEC systems ensure that devices will be able to process any file by always requiring a DSP. These systems have two disadvantages. They preclude the use of less expensive devices, ones without a DSP, and since they do not compress or decompress data transferred between applications and files, they fail to solve the application size and complexity problem.

There are also software-only CODEC systems, which perform all CODEC functions in software, regardless of whether a DSP is available. The file I/O handler in these systems typically detects a file's format and which, if any, compression technique was used by reading the file header upon opening the file. The file I/O handler maintains a library of CODEC routines. Using the appropriate routine, the file I/O handler passes uncompressed data to and from the application or device, regardless of the file's compression type. However, when a DSP-equipped device is available, these systems waste valuable CPU time performing software CODEC functions, and therefore negatively impact overall system performance.

Consequently, neither hardware-only nor software-only CODEC systems solves the problems of resource utilization and application size and complexity.

Accordingly, an object of the invention is to provide maximum compatibility between digital signal applications or digital signal devices and the files they process, without regard to any compression technique or file format that may have been used to create the files.

A further objective of the invention is to optimize resource utilization and overall system performance related to compression and decompression of digital signals.

A further objective of the invention is to provide maximum flexibility to digital signal device purchasers.

SUMMARY OF THE INVENTION

The invention achieves the foregoing objects by dynamically choosing between hardware and software CODEC techniques based on the hardware resources available and on each file's compression type. The invention further provides a common, uncompressed data interchange format between applications and data files, regardless of the compression technique or file format used to create the data file.

More specifically, the invention employs a digital signal manager positioned between the file I/O handler and digital signal devices or application programs. In response to a file's compression type, as indicated in the file's header, and the characteristics of the digital signal device, as stored in a "resource file" or as sensed by the digital signal manager or by interrogating the device directly, the digital signal manager dynamically selects either a hardware or software CODEC technique for transfers between the digital signal device and the file. The digital signal manager also provides a common data interchange format to the application programs, which in accordance with an illustrative embodiment, is uncompressed data. Thus, each application need only be concerned with a single compression type and file format.

More particularly, in response to an application's request to open a file, if an existing file contains compressed data, or a new file is to contain compressed data, the digital signal manager instructs the file I/O handler to invoke the appropriate decompression routine when the application retrieves data from the file, and to invoke the appropriate compression routine when the application stores data in the file. If the file contains uncompressed data, or a new file is to contain compressed data, the digital signal manager instructs the file I/O handler to pass the data unmodified between the application and the file. That is, the digital signal manager makes all files appear to the application as though they were uncompressed. This common, uncompressed, data format provides compatibility between substantially all applications and substantially all digital signal files, regardless of which, if any, compression techniques were used to create the files.

The digital signal manager maintains resource files that contain selected operating characteristics of each available digital signal device. The resource files may be supplied, for example, by the device vendors. These characteristics include information concerning the device's operating mode (s), including, for each operating mode, the sampling rate, i.e. the number of samples per second taken by the device; the precision, i.e. the number of data bits per sample; and the number of analog channels used. The resource files also include additional information, such as the presence and quantity in the device of various hardware components useful for data compression or decompression, for example a DSP and the amount of memory available to the DSP.

In response to an application's request to establish a file handle between an existing file and a digital signal device, the digital signal manager uses the file 110 handler to read the file's header and to ascertain the file's characteristics. These characteristics include the sampling rate, precision, number of channels, and which compression technique, if any, was used to create the file. If the application specifies a new file, then the application may specify the file's characteristics, although the file I/O handler specifies default characteristics. The digital signal manager uses both the file's characteristics and the device's hardware characteristics, as reflected in the resource file, to decide whether the device can process the data directly, or whether the data must be compressed or decompressed by a software CODEC routine first.

The digital signal manager then controls the file I/O handler to transfer the data in an appropriate manner. For example, if the digital signal manager ascertains that the device can directly process the data in the file, the digital signal manager adjusts the device's operating characteristics to match as closely as possible the characteristics under which the data file was created. The digital signal manager then instructs the file I/O handler to pass the data directly between the device and the file, that is, without the file I/O handler compressing or decompressing the data.

Alternatively, if the digital signal manager ascertains that the data must be compressed or decompressed before the transfer, the digital signal manager instructs the file I/O handler to invoke the appropriate decompression routine when the device reads from the file, and the appropriate compression routine when the device writes to the file; the file I/O handler performs software compression/decompression.

The use of the digital signal manager to decide whether the data must be compressed or decompressed by a software CODEC routine enhances resource utilization. A DSP is utilized whenever possible to process the data, freeing the central processing unit (CPU) to perform other functions. The CPU performs software compression/decompression only when the device is incapable of processing the data directly, yet devices without DSPs are not limited to operating with uncompressed data files.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
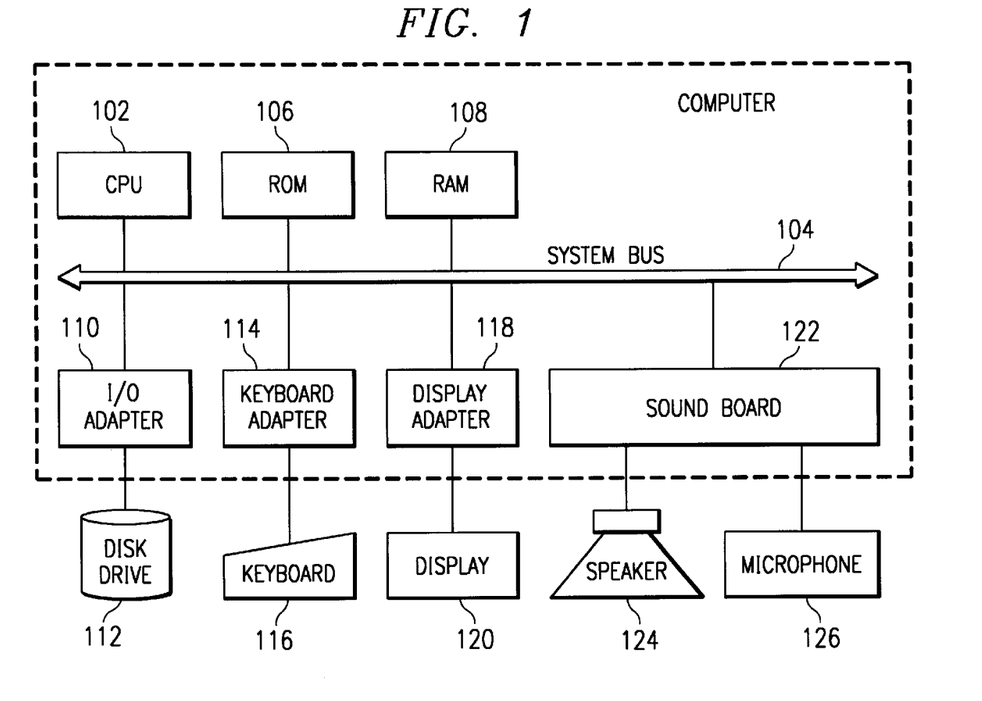
FIG. 1 is a schematic block diagram of a computer on which an embodiment of the invention can be practiced.

The invention is preferably practiced in the context of an operating system resident on a personal computer, such as the system represented in FIG. 1. The computer 100 is controlled by a central processing unit (CPU) 102, which may be a conventional microprocessor, and a number of other units, which are provided to accomplish specific tasks.

A system bus 104 interconnects the CPU 102 and the other units. Although a particular computer may only have some of the units illustrated in FIG. 1, or may have additional components not shown, most computers will include at least the units shown. Specifically, the computer 100 includes a read-only memory (ROM) 106 for permanent storage of the computer's configuration and basic operating commands; a random access memory (ROM) 108 for temporary storage of instructions and data; an input/output (I/O) adapter 110 for connecting peripheral devices such as a disk unit 112; a keyboard adapter 114 for connecting a keyboard 116; a display adapter 118 for connecting a display 120; and a digital signal device, which in this example is a sound board 122 for connecting a speaker 124 and a microphone 126. Hereinafter, the ROM 106, RAM 108, and disk unit 112 collectively are referred to as the "data storage units".

Figure 2:
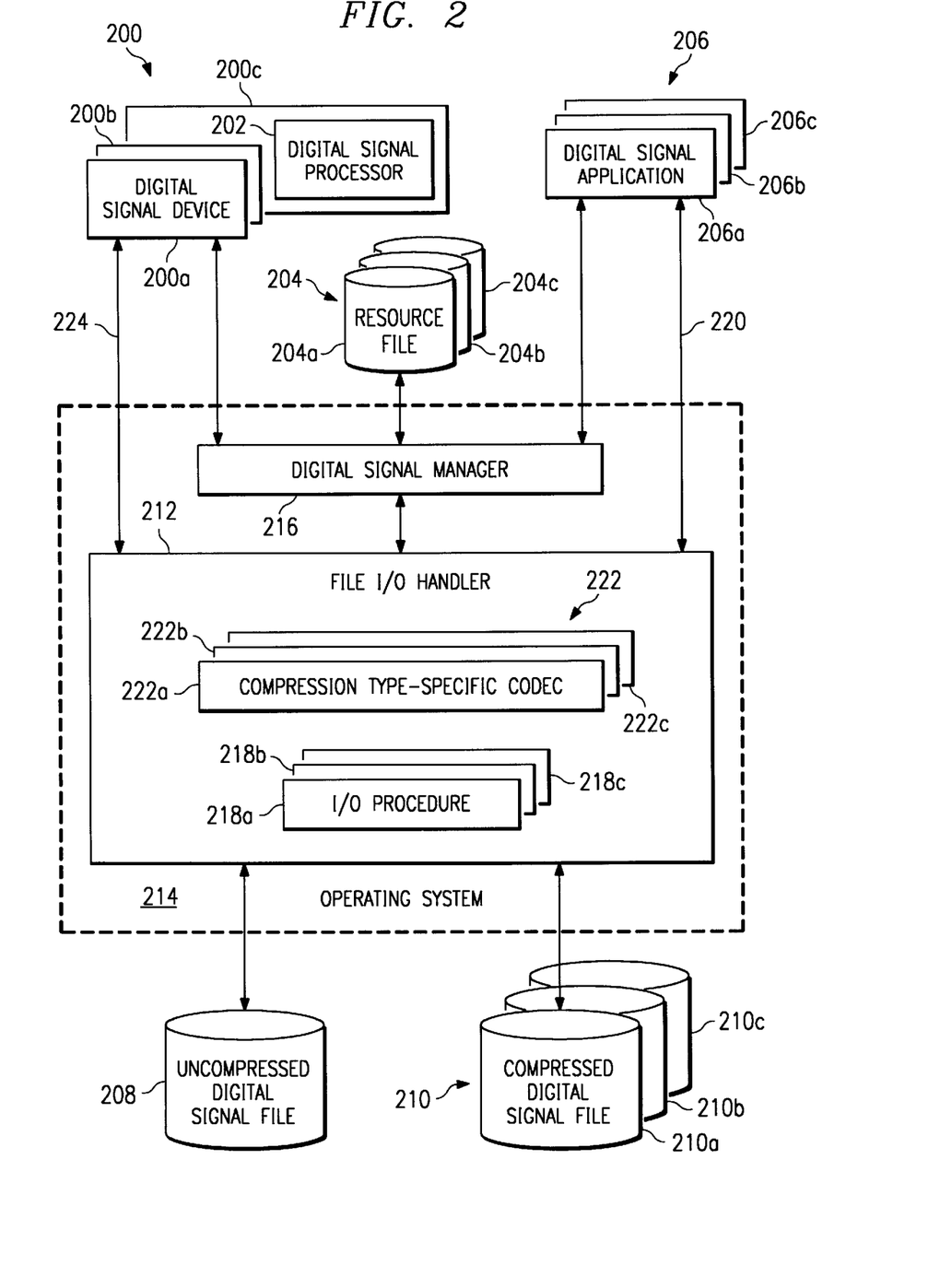
FIG. 2 is a schematic block diagram showing the invention in relation to other software and hardware components with which it interacts.

FIG. 2 depicts various files containing programs and data and resident in the various data storage units in the system. The system may contain one or more digital signal devices, for example 200a, 200b, and 200c. Optionally, one or more devices, such as 200c, may incorporate a digital signal processor (DSP) 202. In the preferred embodiment of the invention, the vendor who supplies a device also supplies a resource file, for example 204a, 204b, or 204c, corresponding to the device 200a, 200b, or 200c, respectively. Hereinafter, the resource file is referred to as "resource file 204". Each resource file 204 lists, for example, whether the associated device 200 incorporates a DSP, the amount of memory associated with the DSP, the characteristics of the device 200 that can be adjusted and the range of values of these characteristics. The use of the resource file 204 is described in more detail below.

The system contains one or more applications, for example 206a, 206b, and 206c, each resident in the RAM 108 or ROM 106 of FIG. 1. Hereinafter, the application is referred to as "application 206".

Digital signal files 208, 210a, 210b, and 210c contain digital signals. File 208 contains uncompressed data. Files 210a, 210b, and 210c, on the other hand, contain data compressed according to different compression techniques, although more than three such techniques exist. Each file contains a data portion containing digital signals and a header portion specifying characteristics of the data portion, e.g. sampling rate, bits per sample and compression format, i.e. uncompressed or compression technique. The application 206 or the device 200 interacts with a file 208 or 210 by means of a file input/output (I/O) handler 212. The file I/O handler 212 is part of the computer operating system 214, and it manages the administrative operations of opening and closing the files and actually storing and retrieving data in a storage device. The operating system 214 and its file I/O handler 212 reside in the RAM 108 and/or ROM 106 of FIG. 1.

An application 206 can perform two types of operations. In the first type, the application 206 reads and/or writes a digital signal in one or more files 208 and/or 210 in order to perform a non-real-time operation, for example to cut a segment of audio data from one file and paste it into another file. In the second type of operation, the application 206 instructs the device 200 to perform a real-time operation, for example record or play back, and the device 200 then reads or writes a digital signal in a file 208 or 210. These two types of operation are described in detail below.

When performing an operation of the first type, non-real-time, the application 206 sends a request to the operating system 214, i.e. to the digital signal manager 216. The request identifies the file 208 or 210 to be processed. The digital signal manager 216 performs the operations generally illustrated in the flow chart in FIG. 3. Thus the digital signal manager 216 begins at step 300 and sends a request at step 302 to the file I/O handler 212 to open the file 208 or 210 and to detect which, if any, compression technique was used to create the file, and in which format the file exists.

The file I/O handler 212 may contain an "I/O procedure", for example 218a, 218b, or 218c, for each combination of file format and storage medium that the system supports. Each I/O procedure is capable of storing data in and retrieving data from a file, and translating between the file's format and a common format. The file I/O handler 212 interrogates the I/O procedures until it finds one that recognizes the file 208 or 210; the file I/O handler uses this I/O procedure for all transfers to and from the file 208 or 210. This arrangement, which is not part of the present invention, is described in more detail in commonly assigned U.S. patent application Ser. No. 07/960,976, filed on Dec. 31, 1991 by D. M. Dorrance, et al, for a Data Processing File Format Transparency System, which is hereby incorporated by reference. The file I/O handler 212 also detects which, if any, compression technique was used to create the file 208 or 210 by reading the file's header, and provides this information to the digital signal manager 216.

Figure 3:
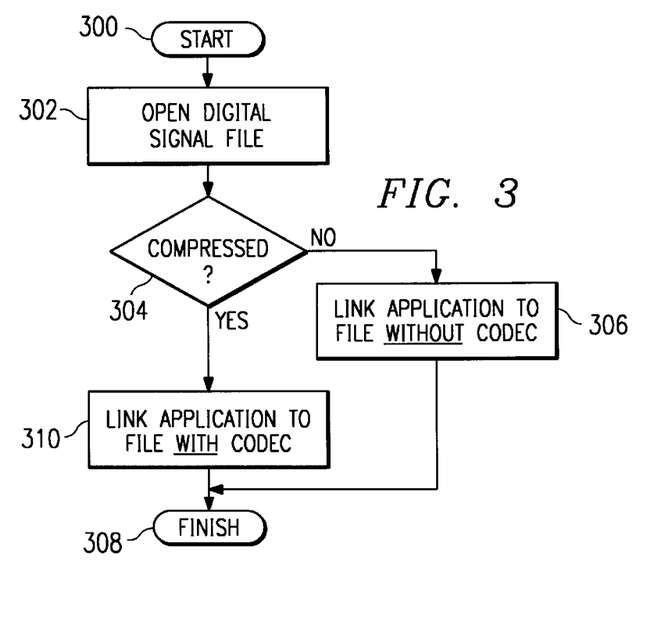
FIG. 3 is a flow chart, which illustrates how the embodiment illustrated in FIG. 2 handles interactions between an application and the file I/O handler.

At step 304 the digital signal manager 216 examines the response from the file I/O handler 212. If the file is uncompressed, the digital signal manager 216 establishes at step 306 a file handle 220 between the file I/O handler 212 and the application 206. A file handle is sometimes referred to as a "channel", and it is well known how to establish a file handle. See, for example, *Multimedia Presentation Manager Programmer Reference,* IBM order number 71G2222. The application 206 then reads and/or writes in the file 208. The digital signal manager 216 finishes at step 308.

If the file is compressed, the file I/O handler 212 loads into the file I/O handler the appropriate compression type-specific compression/decompression (COmpression/DECompression or CODEC) routine, for example 222a, 222b, or 222c. This process, which is not part of the present invention, is described in more detail in commonly assigned U.S. patent application Ser. No. 07/981040, filed on Nov. 24, 1992 by Fetchi Chen and Daniel Michael Dorrance, for a Software Mechanism for Providing CODEC Transparency, which is hereby incorporated by reference. The digital signal manager 216 establishes at step 310 a file handle 220 between the file I/O handler 212 and the application 206. The digital signal manager 216 instructs the file I/O handler 212 to use the appropriate CODEC routine 222 for the data transfers between the application 206 and the file 210. The CODEC routine 222 decompresses the data as the application 206 reads from the file 210 and compresses the data as the application 206 writes to the file 210. The digital signal manager 216 finishes at step 308.

Thus, the digital signal manager 216 ensures that the application 206 exchanges data with the file 208 or 210 in a common, uncompressed format.

Figure 4:
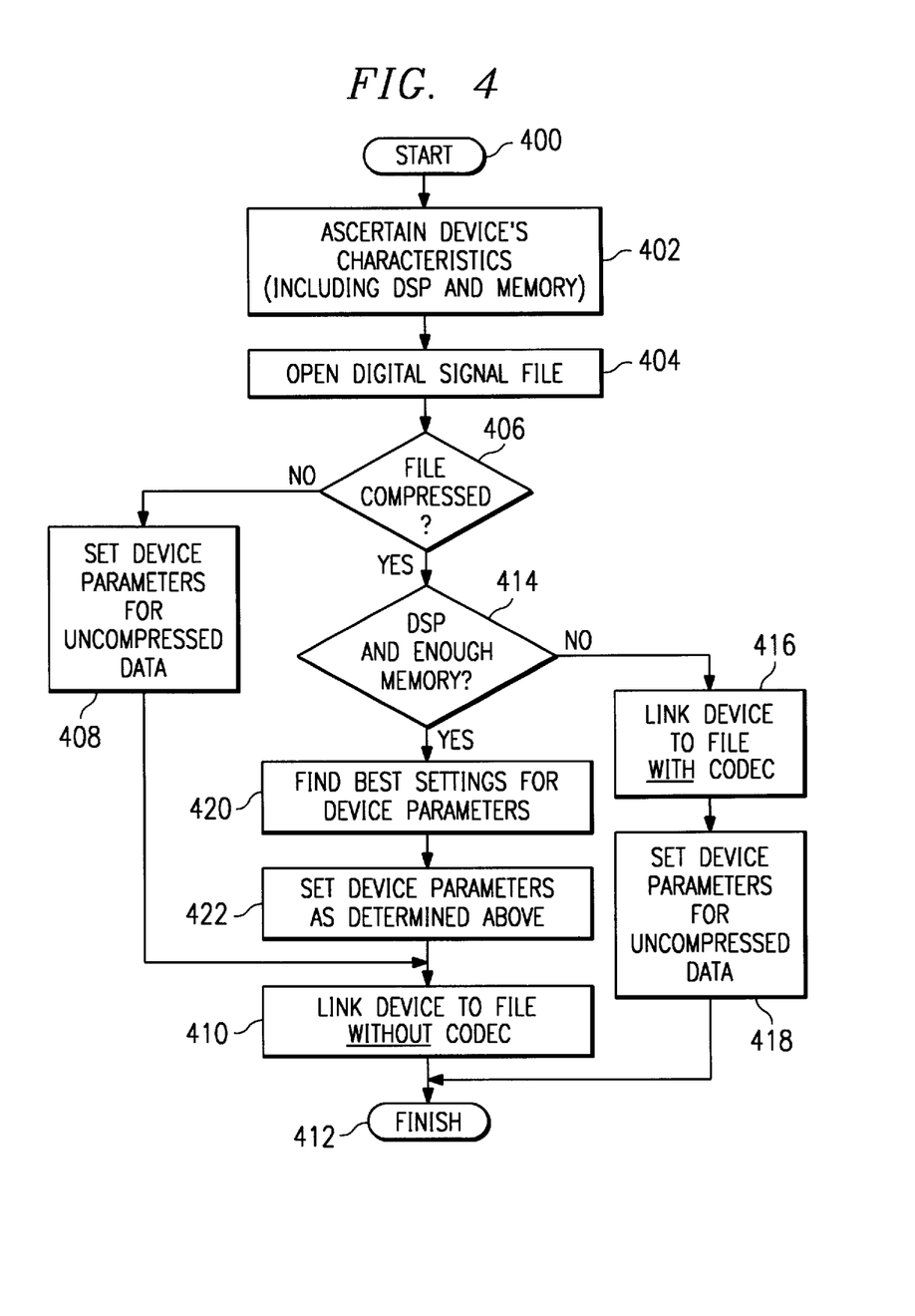
FIG. 4 is a flow chart, which illustrates how the embodiment illustrated in FIG. 2 handles interactions between a digital signal device and the file I/O handler.

In the second type of operation, the application 206 instructs a device 200 to perform a real-time operation. The flow chart in FIG. 4 illustrates generally the operation of the digital signal manager 216 when it performs an operation of the this type. The application 206 sends a request to the operating system 220, i.e. to the digital signal manager 216. The request indicates that the application 206 directs a device 200 to read or write a digital signal in a file 208 or 210.

The digital signal manager 216 starts at step 400. At step 402, it ascertains which characteristics of the device 200 can be adjusted and the range of values these characteristics can take on. In the preferred embodiment, the digital signal manager 216 ascertains the device's characteristics, step 402, by reading the resource file 204. In an alternate embodiment, the digital signal manager 216 ascertains the device's characteristics by interrogating the device 118. These characteristics include the number of samples per second; the precision, i.e. number of data bits per sample; and the number of channels used. Also at step 402, the digital signal manager 216 determines whether the device 200 has a DSP 202, and if so, the amount of memory available to the DSP.

At step 404, the digital signal manager 216 sends a request to the file I/O handler 212 to open the file 208 or 210 and to detect which, if any, compression technique was used to create the file. At step 406 the digital signal manager 216 examines the response from the file I/O handler 212. If the file is uncompressed, at step 408 the digital signal manager 216 sets the device's adjustable characteristics, thereby instructing the device 200 to process an uncompressed digital signal. The digital signal manager 216 sets the device's adjustable characteristics by well known means, for example by setting and clearing the appropriate bits in the device's control registers. The digital signal manager 216 establishes at step 410 a file handle 224 between the file I/O handler 212 and the device 200. The device 200 then reads from and/or writes to the file 208. The digital signal manager 216 finishes the operation at step 412.

If the file is compressed, at step 414 the digital signal manager 216 determines whether the device 200 has a DSP 202 and sufficient memory to process the digital signal. If the device 200 does not have a DSP or does not have sufficient memory, the digital signal manager 216 establishes at step 416 a file handle 224 between the file I/O handler 212 and the device 200. The digital signal manager 216 instructs the file I/O handler 212 to use a CODEC routine 222 for the data transfers between the device 200 and the file 210. The CODEC routine 222 decompresses the data as the device 200 reads from the file 210 and compresses the data as the device 200 writes to the file 210. Although the file 210 is actually compressed, the device 200 will then process uncompressed data. Therefore, at step 418 the digital signal manager 216 sets the device's adjustable characteristics, thereby instructing the device 200 to process an uncompressed digital signal. The digital signal manager 216 finishes at step 412.

If the device 200 has a DSP and sufficient memory to process the digital signal, the digital signal manager 216 at step 420 calculates the appropriate values for the device's adjustable characteristics. The digital signal manager 216 matches these values as closely as possible to the characteristics under which the digital signal file was created. The digital signal manager 216 calculates the number of bits per sample, the number of channels, and the sampling rate (the number of samples per second) to be used by the device 208.

Figure 5A:
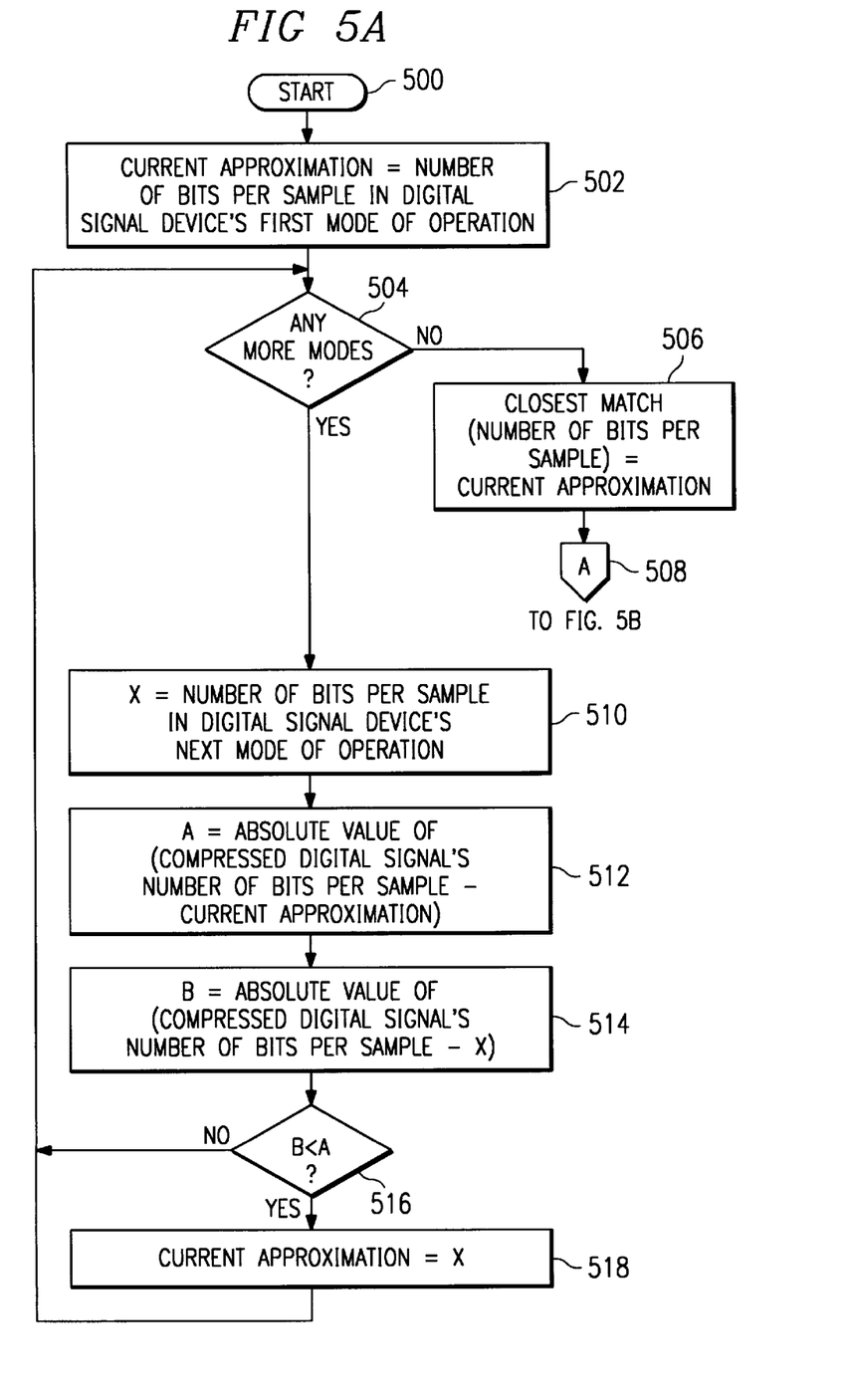
FIG. 5A is a flow chart, which illustrates in more detail a portion of the operation illustrated in FIG. 4, in particular it shows how the embodiment illustrated in FIG. 2 finds is the best "number of bits per sample" match between the file and the device.
Figure 5B:
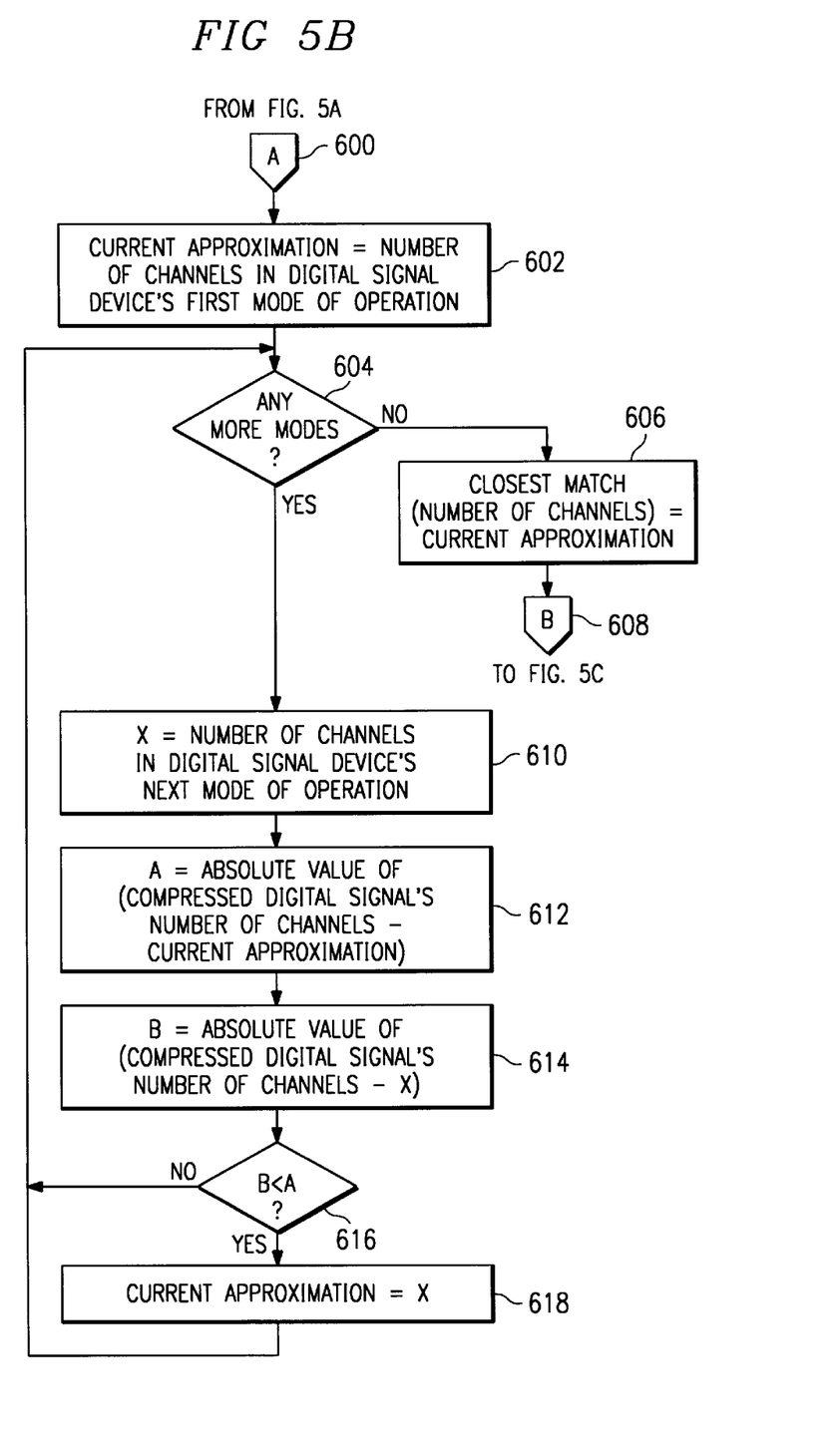
FIG. 5B is a flow chart, which illustrates in more detail a portion of the operation illustrated in FIG. 4, in particular it shows how the embodiment illustrated in FIG. 2 finds the best "number of channels" match between the file and the device.
Figure 5C:
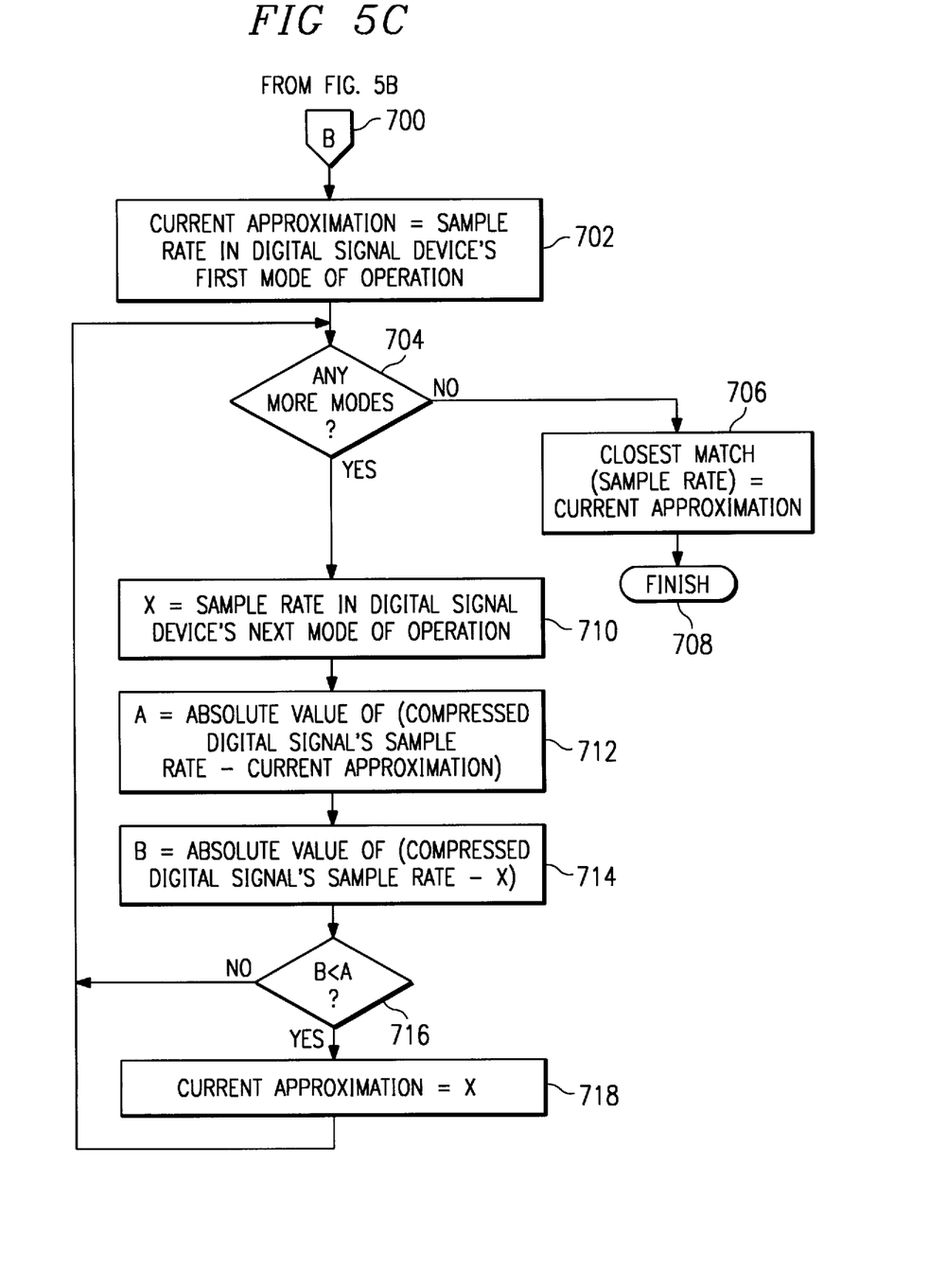
FIG. 5C is a flow chart, which illustrates in more detail a portion of the operation illustrated in FIG. 4, in particular it shows how the embodiment illustrated in FIG. 2 finds the best "number of samples per second" match between the file and the device.

The flow charts of FIG. 5A, 5B, and 5C illustrate generally the operations of step 420. Referring first to FIG. 5A, the digital signal manager 216 starts the number-of-bits-per-sample calculation at step 500, and at step 502 it sets the "current approximation's" to the number of bits per sample in the device's first mode of operation. At step 504 it tests whether the device 200 has any more modes of operation to consider. If there are no more modes to consider, at step 506 the digital signal manager sets the "number of bits per sample closest match" to the "current approximation" and at step 508 it transfers to the flowchart in FIG. 5B.

If there are more modes of operation to consider, the digital signal manager 216 at step 510 sets "X" to the number of bits per sample in the device's next mode of operation. At step 512 the digital signal manager 216 sets "A" to the absolute value of the difference between the file's 210 number of bits per sample and the "current approximation". At step 514 the digital signal manager 216 sets "B" to the absolute value of the difference between the file's 210 number of bits per sample and "X". At step 516 the digital signal manager 216 compares "A" with "B". If "B" is less than "A" the digital signal manager 216 loops back to step 504. Otherwise, at step 518 it sets the "current approximation" to "X" and loops back to step 504.

In FIG. 5B, the digital signal manager 216 starts the number-of-channels calculation at step 600, and at step 602 it sets the "current approximation" to the number of channels in the device's first mode of operation. At step 604 it tests whether the device 200 has any more modes of operation to consider. If there are no more modes to consider, at step 606 the digital signal manager sets the "number of channels closest match" to the "current approximation" and at step 608 it transfers to the flowchart in FIG. 5C.

If there are more modes of operation to consider, the digital signal manager 216 at step 610 sets "X" to the number of channels in the device's next mode of operation. At step 612 the digital signal manager 216 sets "A" to the absolute value of the difference between the file's 210 number of channels and the "current approximation". At step 614 the digital signal manager 216 sets "B" to the absolute value of the difference between the file's 210 number of channels and "X". At step 616 the digital signal manager 216 compares "A" with "B". If "B" is less than "A" the digital signal manager 216 loops back to step 604. Otherwise, at step 618 it sets the "current approximation" to "X" and loops back to step 604.

In FIG. 5C, the digital signal manager 216 starts the sampling rate calculation at step 700, and at step 702 it sets the "current approximation" to the sampling rate in the device's first mode of operation. At step 704 it tests whether the device 200 has any more modes of operation to consider. If there are no more modes to consider, at step 706 the digital signal manager sets the "sampling rate closest match" to the "current approximation" and at step 708 it finishes.

If there are more modes of operation to consider, the digital signal manager 216 at step 710 sets "X" to the sampling rate in the device's next mode of operation. At step 712 the digital signal manager 216 sets "A" to the absolute value of the difference between the file's 210 sampling rate and the "current approximation". At step 714 the digital signal manager 216 sets "B" to the absolute value of the difference between the file's 210 sampling rate and "X". At step 716 the digital signal manager 216 compares "A" with "B". If "B" is less than "A" the digital signal manager 216 loops back to step 704. Otherwise, at step 718 it sets the "current approximation" to "X" and loops back to step 704.

At step 422 in FIG. 4 the digital signal manager 216 sets the device's adjustable characteristics so they are consistent with those calculated at step 420. The digital signal manager 216 establishes at step 410 a file handle 224 between the file I/O handler 212 and the device 200. The device 200 then reads and writes to the file 208. The device 200 performs the CODEC function; this is called "hardware CODEC". The digital signal manager 216 finishes at step 412.

Thus, the digital signal manager 216 dynamically chooses between hardware and software CODEC techniques and in so doing it maximizes the usage of the digital signal devices' hardware capabilities. That is, it uses hardware CODEC techniques whenever they can be used in processing the digitized signals and it uses software CODEC routines whenever hardware CODEC techniques cannot be used. It thus provides for the operation of non-compression-specific application programs while optimizing the overall efficiency of the system in dealing with digital signal files.

While the invention is described in terms of preferred embodiments in a specific system environment, those skilled in the art will recognize that the invention can be practiced, with modifications, in other and different hardware and software environments within the spirit and scope of the appended claims.

What is claimed is:

1. Digital signal managing apparatus operative within a computer having a central processing unit (CPU) for selectively enabling hardware-based and software-based decompression of data requested by a utilization apparatus associated with the computer, the digital signal managing apparatus comprising:

apparatus responsive to a request for determining whether the utilization apparatus contains hardware for decompressing the data without the CPU, the hardware including adjustable characteristics;

apparatus responsive to the request ascertaining a compression technique originally used to compress the data;

a file I/O handler responsive to the request for transferring the data to the utilization apparatus, the file I/O handler being controllable by the CPU to decompress the data while transferring the data to the utilization apparatus;

apparatus cooperating with the determining apparatus and the ascertaining apparatus for controlling the file I/O handler to decompress the data when the utilization apparatus does not contain the hardware; and apparatus for conditioning the hardware to receive the data by conforming the hardware's adjustable characteriscs to the compression technique and for controlling the hardware to decompress the data in accordance with the compression technique when the utilization apparatus does contain the hardware.

2. Digital signal managing apparatus as defined in claim 1 further comprising a resource file containing characteristics of the utilization apparatus and wherein the determining apparatus comprises apparatus for reading the resource file to determine whether the utilization apparatus contains the hardware.

3. Digital signal managing apparatus as defined in claim 1 further comprising a file in which the data is stored prior to transfer, the file comprising information relating to the compression technique and wherein the ascertaining apparatus comprises apparatus for reading the file to ascertain the compression technique.

4. Digital signal managing apparatus as defined in claim 3 wherein the file comprises a header containing information relating to the compression technique and wherein the ascertaining apparatus comprises apparatus for reading the header to ascertain the compression technique.

5. Digital signal managing apparatus as defined in claim 1 wherein the determining apparatus comprises apparatus for directly interrogating the utilization apparatus in order to determine whether the utilization apparatus contains the hardware.

6. Digital signal managing apparatus as defined in claim 1 wherein the utilization apparatus comprises an application program.

7. Digital signal managing apparatus as defined in claim 1 wherein the utilization apparatus comprises a digital signal device.

8. Digital signal managing apparatus as defined in claim 1 wherein the hardware comprises a digital signal processor and signal processing memory.

9. Digital data managing apparatus operative within a computer having a central processing unit (CPU) for selectively enabling hardware-based and software-based decompression of data requested by an application program, the digital data managing apparatus comprising:

apparatus controlled by the application program for determining whether a digital signal device associated with the computer contains hardware for decompressing the data without the CPU, the hardware including adjustable characteristics;

apparatus controlled by the application program for interrogating a header of a file including the data to identify the compression technique originally used to compress the data;

a first mechanism for transferring the data from the file to the digital signal device, the first transferring mechanism comprising a first software program controllable by the CPU to decompress the data during the transfer;

a second mechanism for transferring the data from the file to the application program, the second transferring mechanism comprising a second software program controllable by the CPU to decompress the data during the transfer;

apparatus cooperating with the determining apparatus and the interrogating apparatus for controlling the first software program to decompress the data when the digital signal device does not contain the hardware; and     apparatus for conditioning the hardware to receive the data by conforming the hardware's adjustable characteristics to the compression technique and to decompress the data when the digital signal device does contain the hardware.

10. Digital data managing apparatus as defined in claim 9 further comprising a resource file containing characteristics of the digital signal device and wherein the determining apparatus comprises apparatus for reading the resource file to determine whether the digital signal device contains the hardware.

11. Digital data managing apparatus as defined in claim 10 wherein the determining apparatus comprises apparatus for directly interrogating the digital signal device in order to determine whether the digital signal device contains the hardware.

12. Digital data managing apparatus as defined in claim 11 wherein the hardware comprises a digital signal processor and signal processing memory.

13. A computer system comprising:

a central processing unit;

data storage apparatus;

an application program stored in the data storage and controlling the central processing unit;

compressed multimedia data stored in the data storage apparatus together with a header including information identifying the compression technique originally used to compress the multimedia data;

a digital signal device for utilizing the data, the digital signal device including adjustable characteristics;

apparatus controlled by the application program for determining whether the digital signal device contains a digital signal processor for decompressing the multimedia data without the central processing unit;

apparatus controlled by the application program for interrogating the header to identify the compression technique;

a file I/O handler comprising a first software routine for transferring the data from the data storage apparatus to the digital signal device, the first software routine controllable by the central processing unit to decompress the data during the transfer and a second software routine for transferring the data from the data storage device to the application program, the second software routine controllable by the central processing unit to decompress the data during the transfer;

apparatus cooperating with the determining apparatus and the interrogating apparatus for controlling the first software routine to decompress the data when the digital signal device does not contain the digital signal processor; and     apparatus for conditioning the digital signal device to receive the data by conforming the digital signal device's adjustable characteristics to the compression technique and to decompress the data when the digital signal device does contain the digital signal processor.

14. A computer system as defined in claim 13 further comprising a resource file containing characteristics of the digital signal device and wherein the determining apparatus comprises apparatus for reading the resource file to determine whether the digital signal device contains the digital signal processor.

15. A computer system as defined in claim 14 wherein the determining apparatus comprises apparatus for directly interrogating the digital signal device in order to determine whether the digital signal device contains the digital signal processor.

16. A computer system as defined in claim 15 wherein the digital signal processor comprises signal processing memory.

17. A method operative within a computer having a central processing unit for selectively enabling hardware-based and software-based decompression of data requested by a utilization apparatus associated with the computer, the method comprising the steps of:

A. determining whether the utilization apparatus contains hardware for decompressing the data without the CPU, the hardware including adjustable characteristics;

B. ascertaining a compression technique originally used to compress the data;

C. transferring the data to the utilization apparatus;

D. using a software routine controlled by the CPU to decompress the data when the utilization apparatus does not contain the hardware; and     E. conditioning the hardware to receive the data by conforming the hardware's adjustable characteristics to the compression technique and controlling the hardware to decompress the data in accordance with the compression technique when the utilization apparatus does contain the hardware.

18. A method as defined in claim 17 further comprising the steps of

F. obtaining a resource file containing characteristics of the utilization apparatus; and     G. reading the resource file to determine whether the utilization apparatus contains the hardware.

19. A method as defined in claim 17 further comprising the steps of:

H storing the data in a file prior to transfer, the file comprising information relating to the compression technique; and I. reading the file to ascertain the compression technique.

20. A method as defined in claim 19 wherein the file comprises a header containing information relating to the compression technique and wherein step I comprises the step of:

I1. reading the header to ascertain the compression technique.

21. A method as defined in claim 19 wherein step A comprises the step of

A1. directly interrogating the utilization apparatus in order to determine whether the utilization apparatus contains the hardware.

22. A computer program product for use with a computer system having a central processing unit (CPU), utilization apparatus for utilizing compressed data, and a file I/O handler for transferring data to the utilization apparatus in response to a request, the file I/O handler being controllable by the CPU to decompress data while transferring data to the utilization apparatus, said computer program product comprising:

a computer usable medium having computer readable program code means embodied in said medium for causing a computer to transfer compressed data to a utilization apparatus in response to a request, the computer readable program code means comprising:

first program means for determining whether the utilization apparatus contains decompressing hardware for decompressing the data without the CPU, the decompressing hardware including adjustable characteristics;

second program code means for ascertaining a compression technique originally used to compress the data;

third program code means, cooperating with the first and second program code means, for controlling the file I/O handler to decompress the data when the utilization apparatus does not contain the hardware; and fourth program code means for conditioning the decompressing hardware to receive the data by conforming the decompressing hardware's adjustable characteristics to the compression technique and for controlling the decompressing hardware to decompress the data in accordance with the compression technique when the utilization apparatus does contain the hardware.

23. The computer program product of claim 22, wherein the system further includes a resource file containing characteristics of the utilization apparatus and wherein the first program code means includes program code means for reading the resource file to determine whether the utilization apparatus contains the hardware.

* * * * *

UNITED STATES PATENT AND TRADEMARK OFFICE
CERTIFICATE OF CORRECTION

PATENT NO : 5,838,996
DATED : November 17, 1998
INVENTOR(S) : Linden A. deCarmo

It is certified that error appears in the above-identified patent and that said Letters Patent is hereby corrected as shown below:

Column 4, line 53, delete "110" and substitute --I/O--
Column 5, line 46, delete "is"
Column 10, lines 38-39, delete "characteriscs" and substitute --characteristics--

Signed and Sealed this

Twenty-eighth Day of September, 1999

Attest:

Q. TODD DICKINSON

*Attesting Officer*   *Acting Commissioner of Patents and Trademarks*